United States Patent
Kang

(10) Patent No.: US 11,192,518 B2
(45) Date of Patent: Dec. 7, 2021

(54) CURTAIN AIR BAG DEVICE

(71) Applicant: HYUNDAI MOBIS CO., LTD., Seoul (KR)

(72) Inventor: Dong Ho Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/846,130

(22) Filed: Apr. 10, 2020

(65) Prior Publication Data
US 2020/0324731 A1    Oct. 15, 2020

(30) Foreign Application Priority Data

Apr. 12, 2019  (KR) .................. 10-2019-0042808

(51) Int. Cl.
*B60R 21/232* (2011.01)
*B60R 21/2338* (2011.01)
*B60R 21/201* (2011.01)

(52) U.S. Cl.
CPC ........ *B60R 21/232* (2013.01); *B60R 21/2338* (2013.01); *B60R 21/201* (2013.01); *B60R 2021/23386* (2013.01)

(58) Field of Classification Search
CPC . B60R 21/232; B60R 21/2338; B60R 21/201; B60R 2021/23386; B60R 21/213
See application file for complete search history.

(56) References Cited

U.S. PATENT DOCUMENTS

| | | | |
|---|---|---|---|
| 6,279,941 B1* | 8/2001 | Nakajima | B60R 21/213 280/728.2 |
| 6,431,587 B1* | 8/2002 | O'Docherty | B60R 21/232 280/729 |
| 6,435,543 B1* | 8/2002 | Magoteaux | B60R 21/232 280/730.2 |
| 6,527,296 B2* | 3/2003 | Bakhsh | B60R 21/232 280/730.2 |
| 2005/0082798 A1* | 4/2005 | Tallerico | B60R 21/201 280/730.2 |
| 2005/0134025 A1* | 6/2005 | Ridella | B60R 21/232 280/730.2 |
| 2006/0043704 A1* | 3/2006 | Coon | B60R 21/213 280/730.2 |
| 2011/0057422 A1* | 3/2011 | Cheal | B60R 21/201 280/728.2 |
| 2013/0093167 A1* | 4/2013 | Volkmann | B60R 21/232 280/729 |
| 2015/0102588 A1* | 4/2015 | Cheal | B60R 21/201 280/728.2 |
| 2015/0191141 A1* | 7/2015 | Wang | B60R 21/216 280/730.2 |

(Continued)

*Primary Examiner* — Drew J Brown
(74) *Attorney, Agent, or Firm* — DLA Piper LLP (US)

(57) ABSTRACT

Provided is a curtain air bag device including a cushion body provided with a main cushion part and a cushion moving part that is inflated by gas injected from an inflator when the cushion body is deployed and presses the main cushion part in a desired direction, a strap part configured to bind the cushion body such that the main cushion part and the cushion moving part keep a folded shape and to be broken when the cushion body is deployed, and a mounting part connected to the cushion body and coupled to a vehicle body.

16 Claims, 14 Drawing Sheets

SECTION A-A'

(56) References Cited

U.S. PATENT DOCUMENTS

2015/0291119 A1* 10/2015 Noma .................. B60R 21/201
                                                           280/728.2
2018/0111579 A1*  4/2018 Shimizu ............... B60R 21/201
2020/0269799 A1*  8/2020 Iwata .................. B60R 21/232

* cited by examiner

SECTION A-A'

SECTION B-B'

CURTAIN AIR BAG DEVICE

CROSS-REFERENCE TO RELATED APPLICATION

This application claims priority from and the benefit of Korean Patent Application No. 10-2019-0042808, filed on Apr. 12, 2019, which is hereby incorporated by reference for all purposes as if set forth herein.

BACKGROUND

Field

Exemplary embodiments of the present disclosure relate to a curtain air bag device, and more particularly, to a curtain air bag device installed in a vehicle in order to protect a passenger in the event of a vehicle collision.

Discussion of the Background

A vehicle air bag device is a safety device that reduces an impact applied to a passenger by inflating a cushion in the event of a collision and may be classified into a driver air bag (DAB), a passenger air bag (PAB), a side air bag (SAB), a curtain air bag (CAB), a roof air bag, and the like.

Since the curtain air bag device covers a door glass when it is deployed downward from an upper vehicle body such as a roof, it is named because it takes the shape of a curtain installed on a window, and is deployed as a whole from the sides of a front seat and a rear seat to protect a passenger's head and upper body.

When the related curtain air bag device is deployed downward toward a vehicle interior in a state of being installed in the vehicle body as described above, it may not be smoothly deployed at a desired shape and speed by interfering with a vehicle body peripheral device such as a trim disposed below an initial mounting position. Therefore, there is a need to solve such a problem.

SUMMARY

Various embodiments are directed to providing a curtain air bag device that can be smoothly deployed while avoiding interference with a vehicle body peripheral device.

In an embodiment, a curtain air bag device includes a cushion body provided with a main cushion part and a cushion moving part that is inflated by gas injected from an inflator when the cushion body is deployed and presses the main cushion part in a desired direction; a strap part configured to bind the cushion body such that the main cushion part and the cushion moving part keep a folded shape and to be broken when the cushion body is deployed; and a mounting part connected to the cushion body and coupled to a vehicle body.

The cushion moving part is formed to communicate with the main cushion part, is located at an upstream of the main cushion part with respect to flow of the gas, and is disposed between the main cushion part and the vehicle body in a state in which the cushion body is folded.

The strap part includes: a first strap disposed corresponding to the cushion moving part; and a second strap disposed spaced apart from the first strap and configured to keep the folded state of the cushion body together with the first strap.

The first strap includes a middle strap disposed corresponding to one or more middle portions in an extension direction of the cushion moving part.

The middle strap includes: a strap body configured to surround a circumference of the folded cushion body; and a fixing portion formed on the strap body and fixed to an inactive part formed on the cushion body.

The first strap includes one or more side straps disposed corresponding to an end portion in the extension direction of the cushion moving part.

The strap part includes: a strap body configured to surround the circumference of the folded cushion body; a strap binding portion formed on the strap body and configured to restrain movement of an end portion of the strap body; and a tear portion formed on the strap body and cut by a deployment force of the cushion body.

The strap binding portion includes: a first binding portion formed at one end portion of the strap body; and a second binding portion formed at the other end portion of the strap body and coupled to the first binding portion in a state in which the strap body surrounds the cushion body.

The first binding portion includes: a passage cut portion formed at a middle portion in a width direction of the strap body; and a locking base portion formed on both sides in the width direction of the passage cut portion, and the second binding portion includes: a locking cut portion formed at both end portions in the width direction of the strap body; and a locking blade portion formed between the locking cut portion and the end portion of the strap body and locked to the locking base portion by passing through the passage cut portion.

The tear portion is disposed at a lower portion of the folded cushion body.

The cushion body further includes: an inactive part formed on the cushion body and configured to partition the main cushion part and the cushion moving part, and the mounting part includes: a first mounting tap coupled to an end portion of the inactive part; and a second mounting tap coupled to the other end portion of the inactive part and disposed spaced apart from the first mounting tap.

The strap part is disposed between the first mounting tap and the second mounting tap, and is coupled to the inactive part.

The mounting part includes: a mounting tap portion coupled to the cushion body; and a vehicle body coupling portion formed on the mounting tap portion and coupled to the vehicle body by a fastening member.

The mounting tap portion includes: a cushion coupling portion coupled to the cushion body; an extension tab portion connected to the cushion coupling portion and provided with the vehicle body coupling portion; and a bending connection portion formed between the cushion coupling portion and the extension tab portion and having flexibility to bend.

The vehicle body coupling portion includes: one or more main fastening portions formed to pass through the extension tab portion; and one or more movement preventing holes disposed spaced apart from the main fastening portion, and the fastening member includes: a reinforcement fastening member formed between the cushion coupling portion and the extension tab portion, coming into surface contact with the extension tab portion, and having an end portion coupled to the vehicle body by passing through the movement preventing hole; and a main fastening member coupled to the vehicle body by passing through the reinforcement fastening member and the main fastening portion.

According to the curtain air bag device in accordance with the present disclosure, when the inflator is operated, the cushion moving part is inflated to press the main cushion part in a desired direction. Accordingly, the main cushion part can be smoothly deployed in a set direction of avoiding interference with vehicle interior parts such as the vehicle body or the trim without additionally using a separate member such as a ramp.

In accordance with the present disclosure, it is possible to reliably implement an action of pushing the main cushion part away from the vehicle body and the trim by using the cushion moving part as the gas passing through the cushion moving part smoothly flows. By using the strap part, the folded state of the cushion body, particularly, the folded state of the cushion moving part can be stably kept in a desired shape without bending or sagging, so that the flow of the gas passing through the cushion moving part can be substantially prevented from being inhibited due to bending or sagging of a part of the cushion moving part.

In accordance with the present disclosure, the folded state of the cushion moving part is kept constant by using the strap part, so that it is possible to stably implement an operation of the cushion moving part that presses the main cushion part in a desired direction and to guide the deployment of the main cushion part in a set direction depending on the breaking position of the strap part.

Furthermore, in accordance with the present disclosure, by disposing the mounting part for mounting the cushion body to the vehicle body in consideration of the flow of the gas passing through the cushion moving part, more specifically, by positioning the mounting part such that a part of the cushion moving part is not bent or folded, it is possible to more reliably implement an operation of the cushion moving part that presses the main cushion part in a desired direction.

DETAILED DESCRIPTION OF THE ILLUSTRATED EMBODIMENTS

Figure 1:
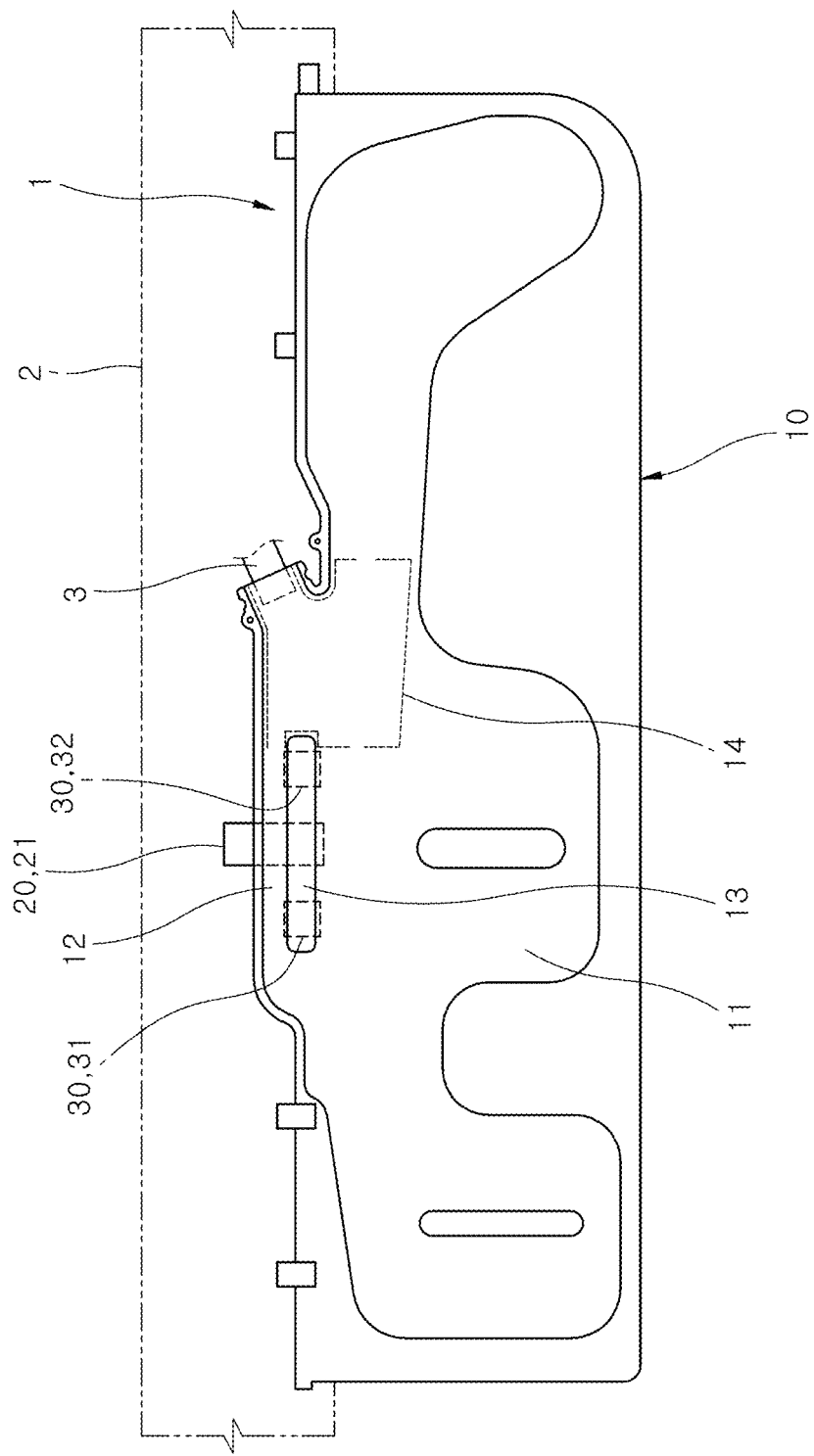
FIG. 1 is a side view schematically illustrating a state in which a curtain air bag device in accordance with an embodiment of the present disclosure is deployed.

Hereinafter, a curtain air bag device according to the present disclosure will be described below with reference to the accompanying drawings through various exemplary embodiments. In this process, the thickness of lines, the size of elements illustrated in the drawings may be exaggerated for the purpose of clarity and convenience of explanation. Terms to be described later are terms defined in consideration of functions in the present disclosure and may be changed according to the intention of a user or an operator, or practice. Accordingly, such terms should be defined based on the disclosure over the present specification.

Figure 2:
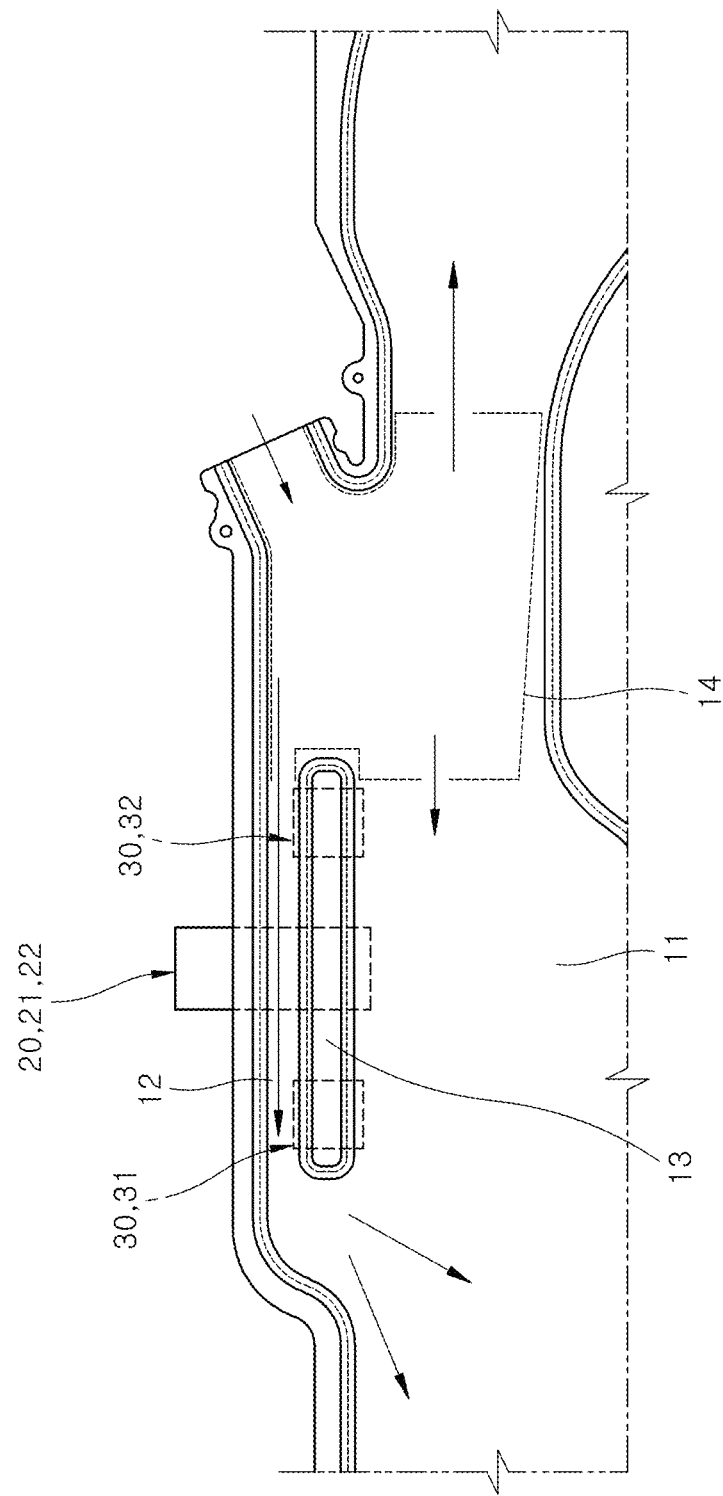
FIG. 2 is an enlarged view of main elements of FIG. 1.
Figure 3:
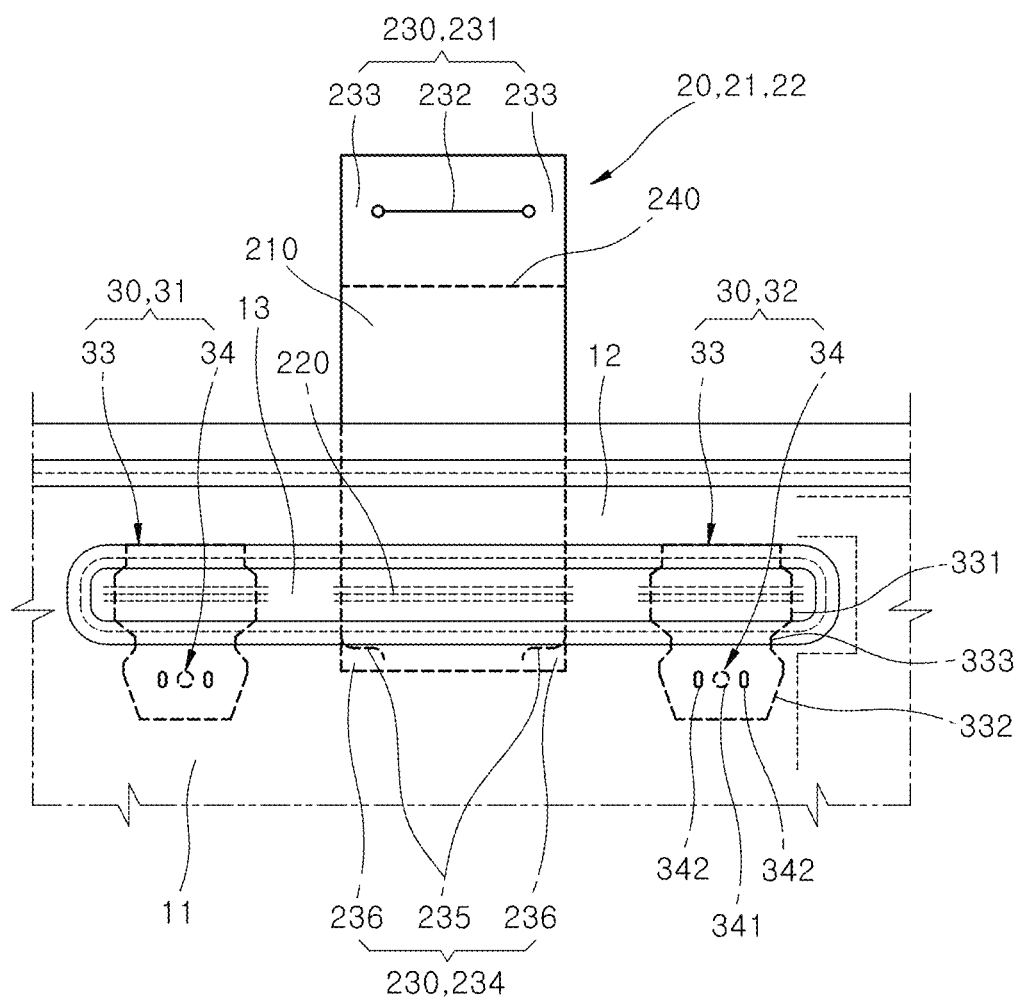
FIG. 3 is a side view of main elements schematically illustrating a state before the curtain air bag device in accordance with an embodiment of the present disclosure is folded.

FIG. 1 is a side view schematically illustrating a state in which a curtain air bag device in accordance with an embodiment of the present disclosure is deployed, FIG. 2 is an enlarged view of main elements of FIG. 1, and FIG. 3 is a side view of main elements schematically illustrating a state before the curtain air bag device in accordance with an embodiment of the present disclosure is folded Referring to FIG. 1 to FIG. 3, a curtain air bag device 1 in accordance with an embodiment of the present disclosure includes a cushion body 10, a strap part 20, and a mounting part 30.

The cushion body 10 is a device part that forms a cushion for protecting a passenger's head, upper body and the like, has a shape extending in the front and rear of a vehicle, is disposed on a lateral upper side of the passenger in a folded state, is inflated downward as illustrated in FIG. 1 by gas injected from an inflator 3 in the event of a vehicle collision, and is deployed at a set vertical width.

Referring to FIG. 2, the cushion body 10 has a shape in which a main cushion part 11 and a cushion moving part 12 are continuously connected. The gas injected from the inflator 3 has a flow path for flowing into the main cushion part 11 via the cushion moving part 12. The cushion moving part 12 is inflated before the main cushion part 11, and presses and pushes the main cushion part 11 in a desired direction, for example, a direction away from a vehicle body 2, thereby substantially preventing the main cushion part 11 from interfering with other parts connected to the vehicle body 2, for example, a trim 5 (see FIG. 4 and FIG. 5).

The strap part 20 is a device part that surrounds and binds the cushion body 10 such that the folded shape of the cushion body 10 can be kept constant, and is broken by the deployment force of the cushion body 10 when the cushion body 10 is deployed. By the strap part 20, it is possible to stably keep the folded state of the cushion body 10, particularly, the folded state of the cushion moving part 12 in a desired form without bending or sagging, and to guide the deployment direction of the main cushion part 11 in a set direction together with the cushion moving part 12 depending on the breaking position of the strap part 20, and the like.

The smoother the flow of the gas passing through the cushion moving part 12, the more reliable the action of pushing the main cushion part 11 away from the vehicle body 2 and the trim 5 by using the cushion moving part 12. By disposing the strap part 20 such that the folded state of the cushion moving part 12 can be kept constant, more specifically, by positioning the strap part 20 in consideration of the flow of the gas passing through the cushion moving part 12, it is possible to more stably ensure the operational reliability of the cushion moving part 12 as described above.

The mounting part 30 is a device part for mounting the cushion body 10 to the vehicle body 2, wherein one side thereof is connected to the cushion body 10 and the other side thereof is coupled to the vehicle body 2. By disposing the mounting part 30 in consideration of the flow of the gas passing through the cushion moving part 12, more specifically, by positioning the mounting part 30 such that a part of the cushion moving part 12 is not bent or folded, it is possible to more stably ensure the operational reliability of the cushion moving part 12 as described above.

Referring to FIG. 1 to FIG. 3, the cushion body 10 in accordance with an embodiment of the present disclosure includes the main cushion part 11, the cushion moving part 12, an inactive part 13, and a gas movement guide part 14.

The main cushion part 11 is a device part that implements a cushion action of the curtain air bag for protecting a passenger's head, upper body and the like, and may have various deployment shapes according to vehicle specifications, body conditions of a passenger, and the like. Since the shape of the main cushion part 11 is not limited to the shape illustrated in FIG. 1 and is not limited to a specific structure and shape including the publicly-known art as long as it can implement the function of a cushion for protecting the body of the passenger, a detailed description of the structure and action thereof will be omitted.

Figure 4:
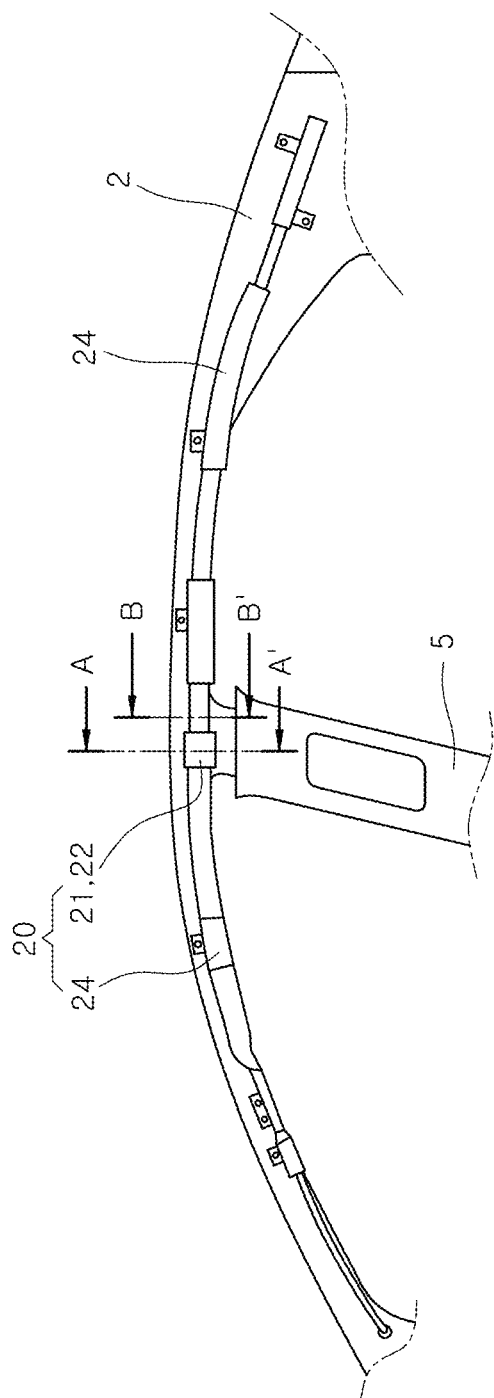
FIG. 4 is a side view schematically illustrating a state in which the curtain air bag device in accordance with an embodiment of the present disclosure is folded and installed in a vehicle.
Figure 5:
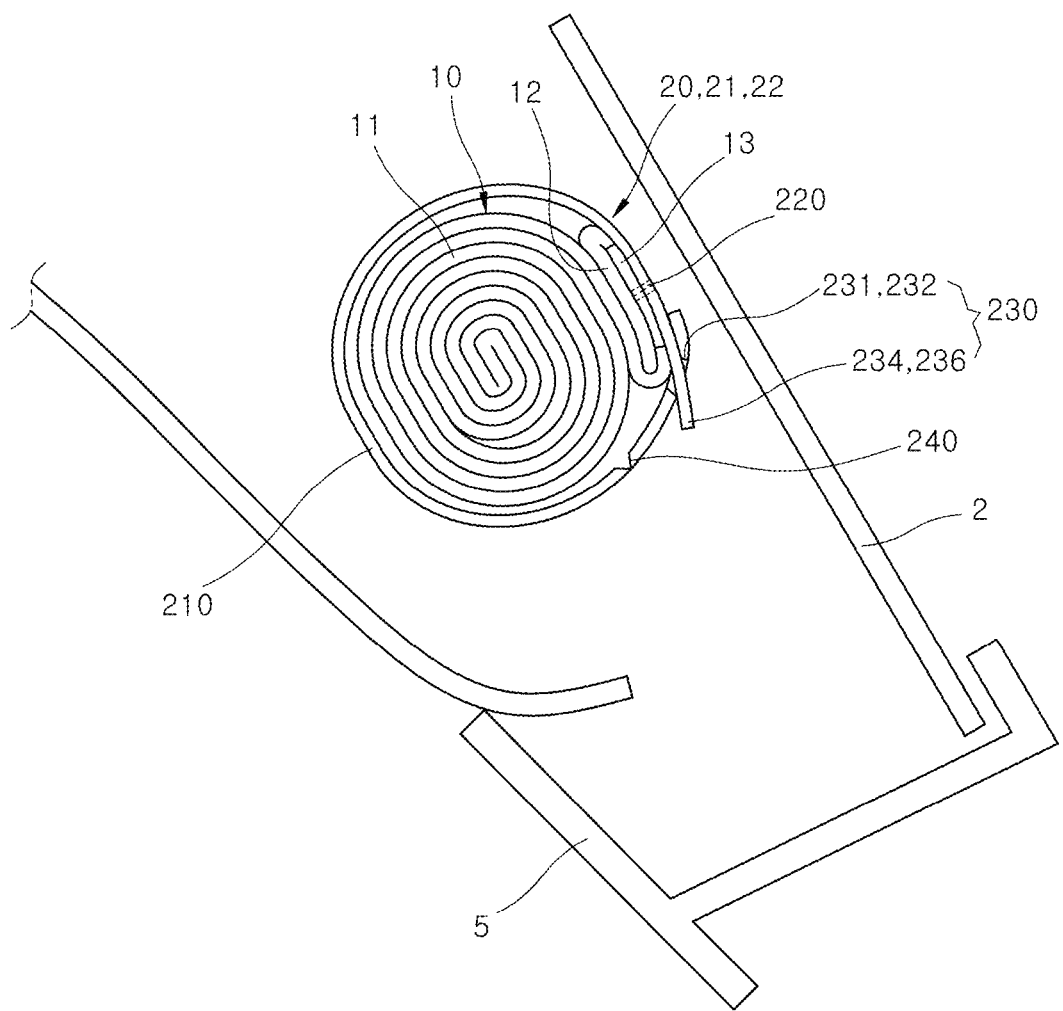
FIG. 5 is a sectional view taken along line A-A' of FIG. 4.
Figure 6:
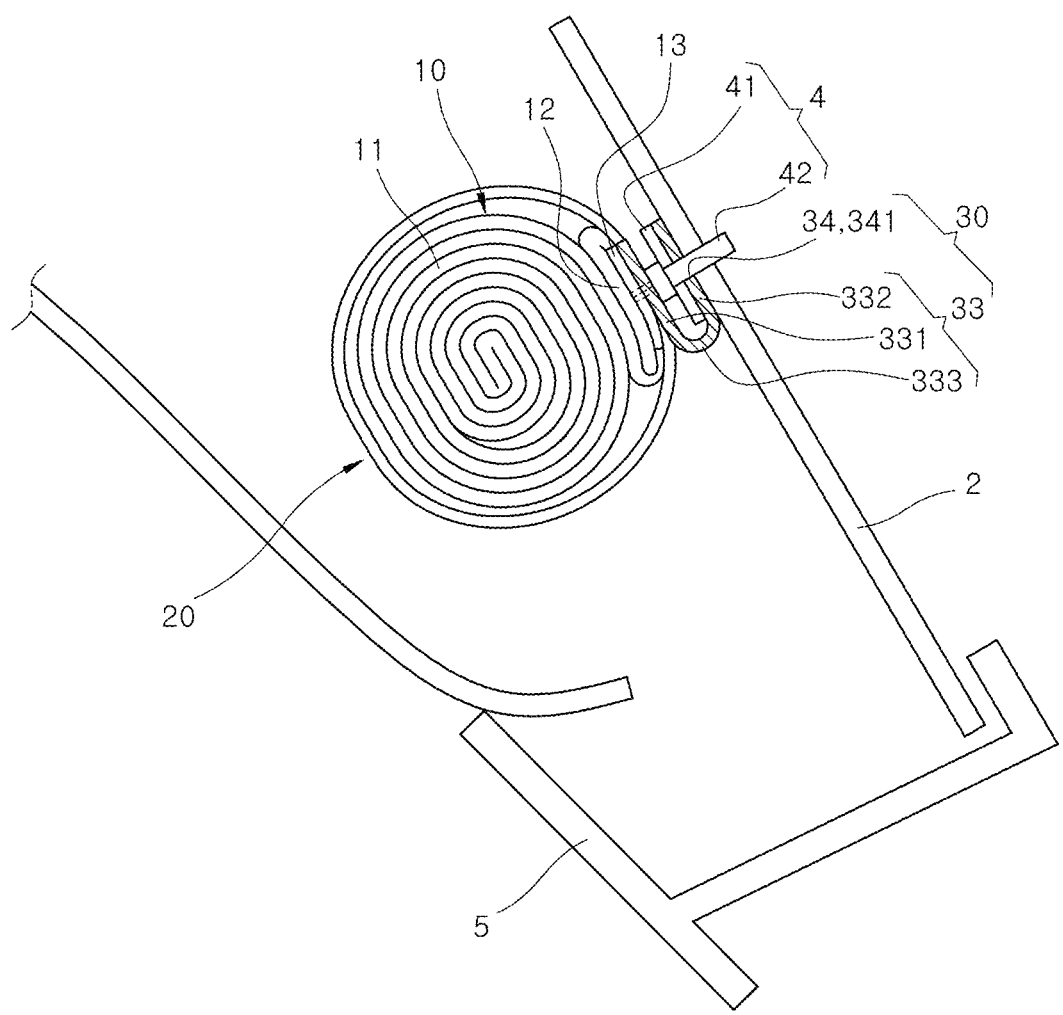
FIG. 6 is a sectional view taken along line B-B' of FIG. 4.

FIG. 4 is a side view schematically illustrating a state in which the curtain air bag device in accordance with an embodiment of the present disclosure is folded and installed in a vehicle, FIG. 5 is a sectional view taken along line A-A' of FIG. 4, and FIG. 6 is a sectional view taken along line B-B' of FIG. 4.

The cushion moving part 12 is inflated by the gas injected from the inflator 3 when the cushion body 10 is deployed and presses the main cushion part 11 in a desired direction, for example, a direction away from the vehicle body 2 and the trim 5 (see FIG. 4). Before the cushion body 10 is folded or is mounted on the vehicle body 2, or in a state in which the cushion body 10 has been deployed, the cushion moving part 12 is located at an upper portion of the cushion body 10 as illustrated in FIG. 1 and FIG. 2.

Furthermore, in a state in which the cushion body 10 has been folded as illustrated in FIG. 4, the cushion moving part 12 is disposed between the main cushion part 11 and the vehicle body 2 as illustrated in FIG. 5 and FIG. 6. Accordingly, when the cushion moving part 12 is inflated, the cushion moving part 12 presses the main cushion part 11 based on a contact portion with the vehicle body 2 and pushes the main cushion part 11 away from the vehicle body 2 in a state in which one side part thereof comes into contact with the vehicle body 2 and the other side part thereof comes into contact with the main cushion part 11 (see FIG. 9 and FIG. 10).

The cushion moving part 12 is formed to communicate with the upper portion of the cushion body 10, more specifically, is disposed at an upstream of the main cushion part 11 with respect to the flow of the gas injected from the inflator 3. That is, the gas injected from the inflator 3 has a flow path for flowing into the main cushion part 11 via the cushion moving part 12.

The arrangement, length, shape, number of the cushion moving parts 12 may be variously changed as needed in consideration of the specifications of a vehicle in guiding the deployment of the main cushion part 11 in a desired direction. In an example, when the curtain air bag device 1 in accordance with the present disclosure is installed in the vehicle body 2 as illustrated in FIG. 5, the cushion moving part 12 may be formed to have a length corresponding to the width of the trim 5 at a position corresponding to the trim 5 in order to substantially prevent interference with the trim 5.

More specifically, the cushion moving part 12 may be disposed corresponding to the position of the trim 5, that is, may be disposed at a middle portion in the front and rear extension direction of the cushion body 10, and may have a front and rear length corresponding to ¼ to ⅛ with respect to the entire front and rear length of the cushion body 10.

Referring to FIG. 1 and FIG. 2 for explaining the present disclosure, the cushion moving part 12 is formed to extend in the front and rear direction on the upper portion of the main cushion part 11 before the cushion body 10 is folded or in a state in which the cushion body 10 has been deployed; however, the present disclosure is not limited thereto. In order to substantially prevent interference between other interior parts of the vehicle, other than the trim 5, and the main cushion part 11, the cushion moving part 12 may be formed in different shapes in different vertical direction positions depending on a direction in which the movement of the main cushion part 11 is induced.

The inactive part 13 is a device part that partitions the main cushion part 11 and the cushion moving part 12, and may be formed by mutually bonding both sides of the cushion body 10 for forming a cushion space through which gas can flow. The inactive part 13 may be formed by mutually bonding both sides of the cushion body 10 by a method such as sewing in a state in which both sides of the cushion body 10 overlap each other.

The main cushion part 11 is disposed on one side of the inactive part 13 and the cushion moving part 12 is disposed on the other side of the inactive part 13. When the inactive part 13 is formed to extend in the front and rear direction on the upper portion of the cushion body 10, the cushion moving part 12 having a shape extending in the front and rear direction is formed above the inactive part 13 and the main cushion part 11 is formed below the inactive part 13.

With such a structure, the inactive part 13 is disposed adjacent to the cushion moving part 12 and extends parallel to the cushion moving part 12. The inactive part 13 in accordance with an embodiment of the present disclosure has a width in the vertical direction, in which the mounting part 30 can be coupled and rigidity capable of supporting the load of the cushion body 10, where the cushion moving part 12 is formed, can be implemented by the mounting part 30. The inactive part 13 is formed in a rectangular or elliptical shape extending horizontally, so that it is possible to implement a set width in the front and rear direction and a set width in the vertical direction.

The gas movement guide part 14 is communicably formed between the inflator 3 and the cushion moving part 12/the main cushion part 11, and distributes and guides the gas injected from the inflator 3 into the cushion moving part 12 and the main cushion part 11. Referring to FIG. 2, the gas movement guide part 14 in accordance with an embodiment of the present disclosure has four openings.

Among the four openings, a first opening (drawing symbol not marked) communicates with the inflator 3, a second opening (drawing symbol not marked) communicates with the cushion moving part 12, a third opening (drawing symbol not marked) communicates with a front portion of the main cushion part 11 into which the air passing through the cushion moving part 12 flows, and a fourth opening (drawing symbol not marked) communicates with a rear portion of the main cushion part 11 where the cushion moving part 12 is not formed. The deployment of the cushion body 10 may be performed at a desired speed and order depending on the sizes and positions of the openings formed in the gas movement guide part 14, and may be variously changed and adjusted as needed.

Referring to FIG. 4, the strap part 20 may be disposed in a plural number along the front and rear extension direction of the cushion body 10 in binding the cushion body 10 such that the main cushion part 11 and the cushion moving part 12 can keep the folded shape. Referring to FIG. 4, the strap part 20 in accordance with an embodiment of the present disclosure includes a first strap 21 and a second strap 24.

The first strap 21 is disposed corresponding to the cushion moving part 12. More specifically, the first strap 21 is installed to surround a middle portion of the cushion body 10 where the cushion moving part 12 is formed. Referring to FIG. 3, the first strap 21 includes a strap body 210, a fixing portion 220, a strap binding portion 230, and a tear portion 240.

The strap body 210 is a device part that surrounds the circumference of the folded cushion body 10 and is formed to have a length capable of surrounding the circumference of the cushion body 10. As a material of the strap body 210, a fiber material and the like having flexibility may be used such that the strap body 210 can be bent by an external force such as an attractive force. The strap body 210 has rigidity capable of keeping the folded state of the cushion body 10 and has a smaller width in the front and rear direction (left and right direction in FIG. 3) than the inactive part 13.

Accordingly, as one strap body 210 presses and binds the entire cushion moving part 12 in the folded state, that is, as a pressing force for inhibiting the inflation of the entire cushion moving part 12 is applied thereto, it is possible to substantially prevent a phenomenon that the flow of the gas into the cushion moving part 12 and the flow of the gas passing through the cushion moving part 12 are not smoothly performed, and to easily implement desired breaking strength by forming the tear portion 240.

The strap body 210 is formed to have a smaller width in the front and rear direction than the inactive part 13, more specifically, has a width in the front and rear direction in which it can be disposed on the inactive part 13 in parallel to the mounting part 30 in the front and rear direction and can be disposed spaced apart from the mounting part 30 without interfering with the mounting part 30. Accordingly, the first strap 21 and the mounting part 30 may be firmly installed using the inactive part 13.

More specifically, the first strap 21 may be mounted at a set position and a set angle based on the inactive part 13 and the mounting part 30 may be coupled to the vehicle body 2 based on the inactive part 13 adjacent to the cushion moving part 12, so that it is possible to stably support the cushion body 10 without causing the bending or folding of the cushion moving part 12. That is, the mounting part 30 is coupled to the vehicle body 2 without causing the bending or folding of the inactive part 13, so that it is possible to stably prevent the bending or folding of the cushion moving part 12 adjacent to the inactive part 13 and to stably ensure the flow path of the gas passing through the cushion moving part 12.

The fixing portion 220 is a device portion fixed on the cushion body 10, and is located corresponding to the inactive part 13 in a state in which a part of the strap body 210 is disposed to overlap the inactive part 13 as illustrated in FIG. 3. The fixing portion 220 may be formed by bonding and fixing the strap body 210 by a method such as sewing in a state in which the strap body 210 is disposed to overlap the inactive part 13.

Figure 7:
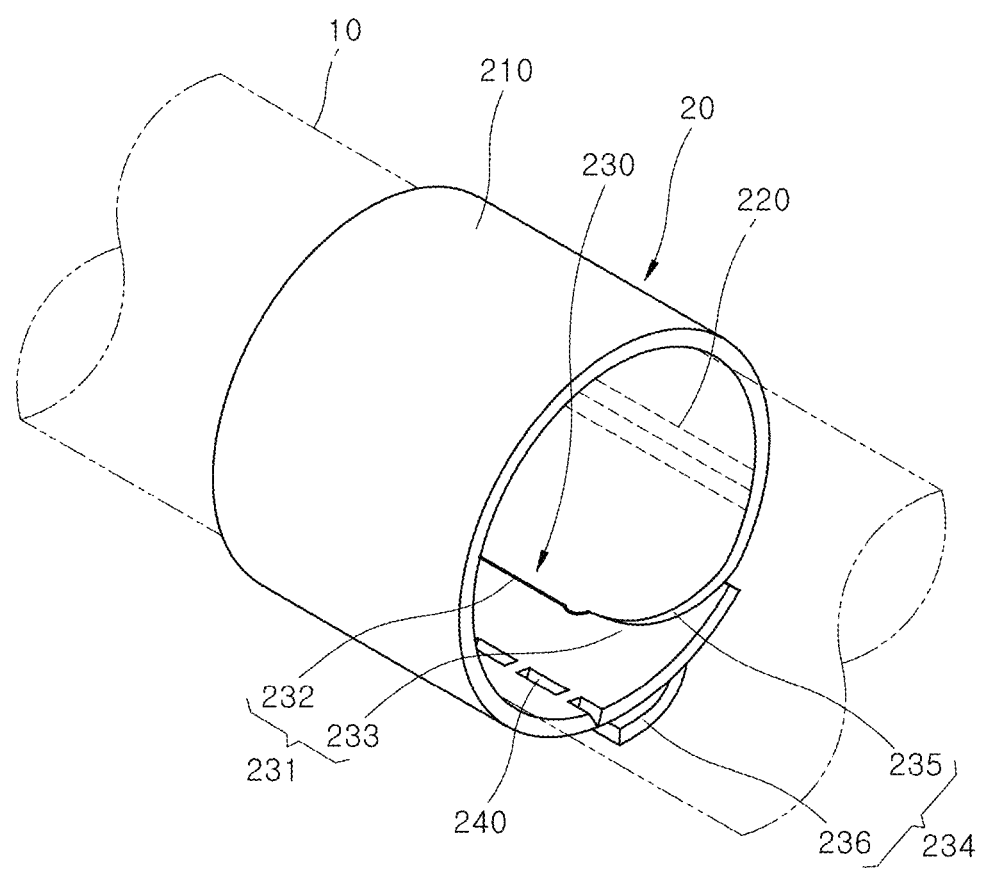
FIG. 7 is a perspective view schematically illustrating an installation state of a strap part of the curtain air bag device in accordance with an embodiment of the present disclosure.
Figure 8A:
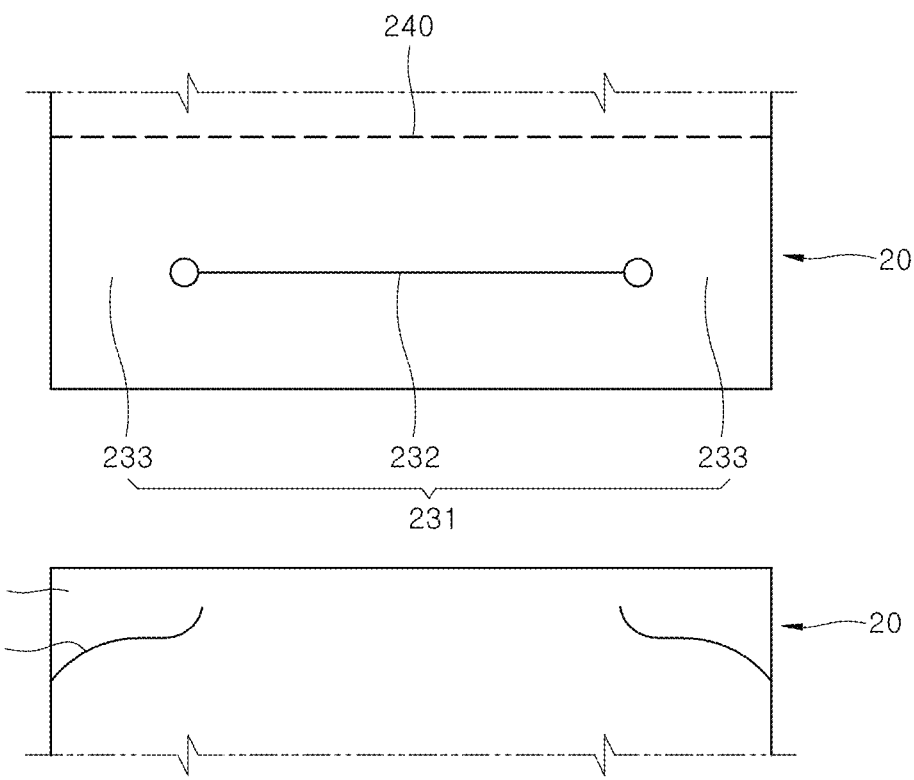
FIG. 8A, FIG. 8B are a conceptual view for explaining an assembly process of a strap binding portion of the strap part of the curtain air bag device in accordance with an embodiment of the present disclosure.
Figure 8B:
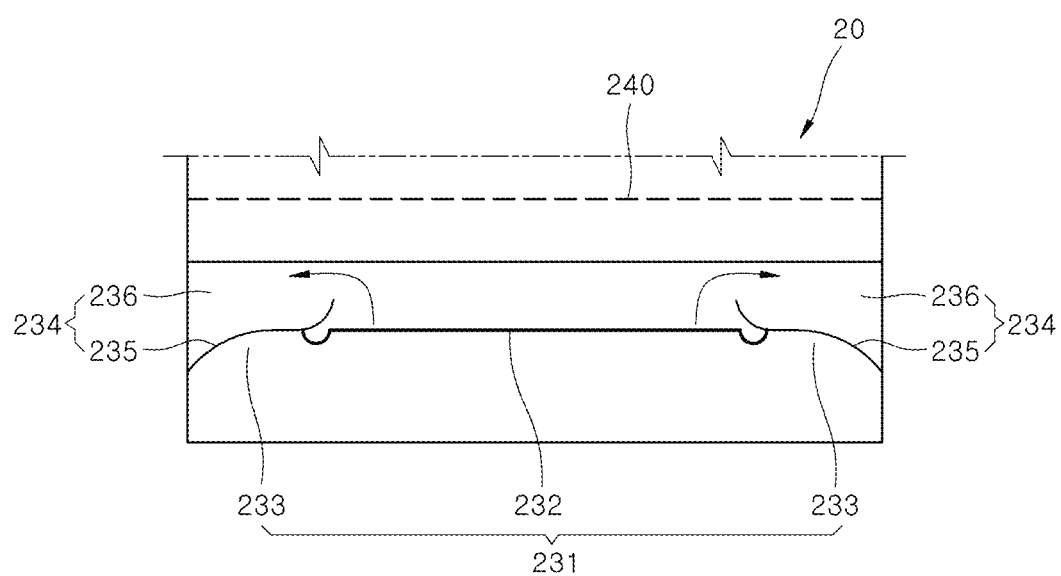

FIG. 7 is a perspective view schematically illustrating the installation state of the strap part of the curtain air bag device in accordance with an embodiment of the present disclosure, FIG. 8A and FIG. 8B are a conceptual view for explaining an assembly process of the strap binding portion of the strap part of the curtain air bag device in accordance with an embodiment of the present disclosure.

The strap binding portion 230 is a device portion for keeping the bonding force for surrounding the circumference of the cushion body 10 by mutually binding the end portions of the strap body 210, and is formed at both end portions of the strap body 210. Referring to FIG. 3, the strap binding portion 230 in accordance with an embodiment of the present disclosure includes a first binding portion 231 formed at one end portion of the strap body 210 and a second binding portion 234 formed at the other end portion of the strap body 210.

In a state in which the strap body 210 surrounds the cushion body 10, the first binding portion 231 and the second binding portion 234 are mutually bound as illustrated in FIG. 7, FIG. 8A and FIG. 8B, so that it is possible to keep the folded state of the cushion body 10. Referring to FIG. 3 and FIG. 8A, the first binding portion 231 in accordance with an embodiment of the present disclosure includes a passage cut portion 232 and a locking base portion 233, and the second binding portion 234 includes a locking cut portion 235 and a locking blade portion 236.

The passage cut portion 232 is formed to extend in a slit shape at a middle portion in the width direction of the strap body 210 (front and rear direction of the vehicle or left and right direction of FIG. 3). The locking base portion 233 is a portion to which the locking blade portion 236 is locked and is formed on both sides in the width direction of the passage cut portion 232. The locking cut portion 235 is formed in a slit shape at both end portions in the width direction of the strap body 210. The locking blade portion 236 is formed between the locking cut portion 235 and the end portion of the strap body 210, and is locked to the locking base portion 233 by passing through the passage cut portion 232 as illustrated in FIG. 8B.

In FIG. 3 illustrating a state before the cushion body 10 is folded, the first binding portion 231 is located above the fixing portion 220 and the second binding portion 234 is located below the fixing portion 220. In a state in which the cushion body 10 is folded as illustrated in FIG. 5, when the first binding portion 231 is moved in the counterclockwise direction of FIG. 5 to reach the second binding portion 234 and the locking blade portion 236 is inserted into the passage cut portion 232 to pass through the passage cut portion 232, the locking blade portion 236 is naturally locked to the locking base portion 233 as illustrated in FIG. 7, so that the first binding portion 231 and the second binding portion 234 are bound to restrain mutual movement.

When the second binding portion 234 is disposed at a position corresponding to the lower portion of the inactive part 13 as illustrated in FIG. 3, an end portion of the strap body 210, where the first binding portion 231 is formed, is located between the inactive part 13 and the vehicle body 2 in an upwardly extended state in the state in which the cushion body 10 is surrounded by the strap body 210 as illustrated in FIG. 5. In such a case, the end portion of the strap body 210, where the first binding portion 231 is formed, may come into contact with the vehicle body 2 according to its length, the inclination of the vehicle body 2, and the like.

Accordingly, the end portion of the strap body 210, where the first binding portion 231 is formed, can stably support the load of the cushion body 10, which acts downward in the state in which the cushion body 10 is installed in the vehicle body 2, is not exposed to an exterior by being covered by the cushion body 10 or other parts of the strap body 210, and its movement in any direction can be stably restrained by a contact force with the vehicle body 2, the cushion body 10, or other parts of the strap body 210, so that it is possible to ensure reliability in implementing a binding force for keeping the folded state of the cushion body 10.

According to the strap part 20 in accordance with the present disclosure, in forming the strap part 20 having a closed loop structure of surrounding the circumference of the cushion body 10, it is possible to firmly surround the circumference of the cushion body 10 by using the strap part 20 through a simple assembly process of binding the first binding portion 231 and the second binding portion 234 without using a separate assembling member or bonding member.

The tear portion 240 is a portion that is cut by the deployment force of the cushion body 10 when the cushion body 10 is deployed, and has a breaking strength such that the tear portion 240 can be preferentially broken compared to other parts of the strap body 210 when the cushion body 10 is deployed. The tear portion 240 may be formed by forming a cut line on the strap body 210 to extend in a transverse direction.

Figure 9:
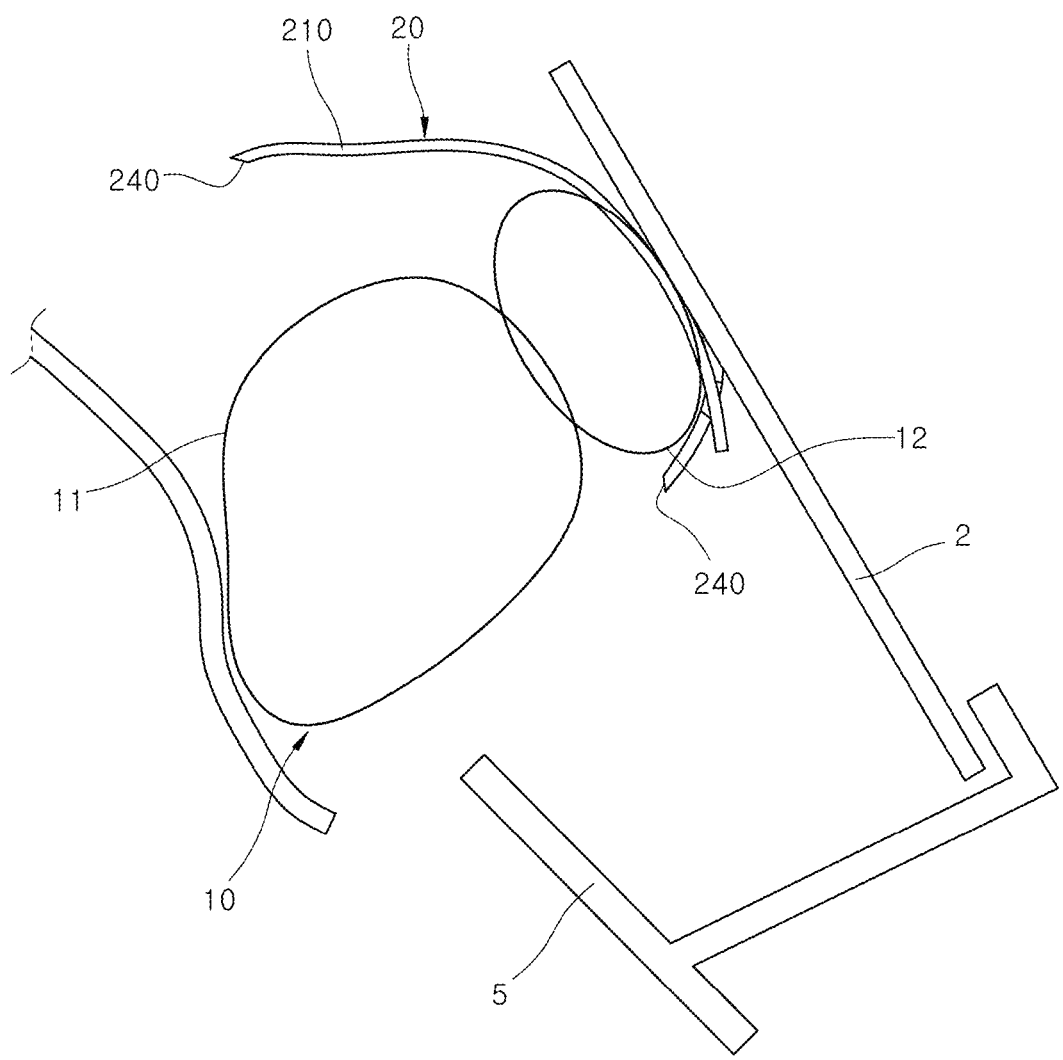
FIG. 9 is a conceptual view for explaining an operation in which the strap part illustrated in FIG. 5 is broken by the deployment force of a cushion body.
Figure 10:
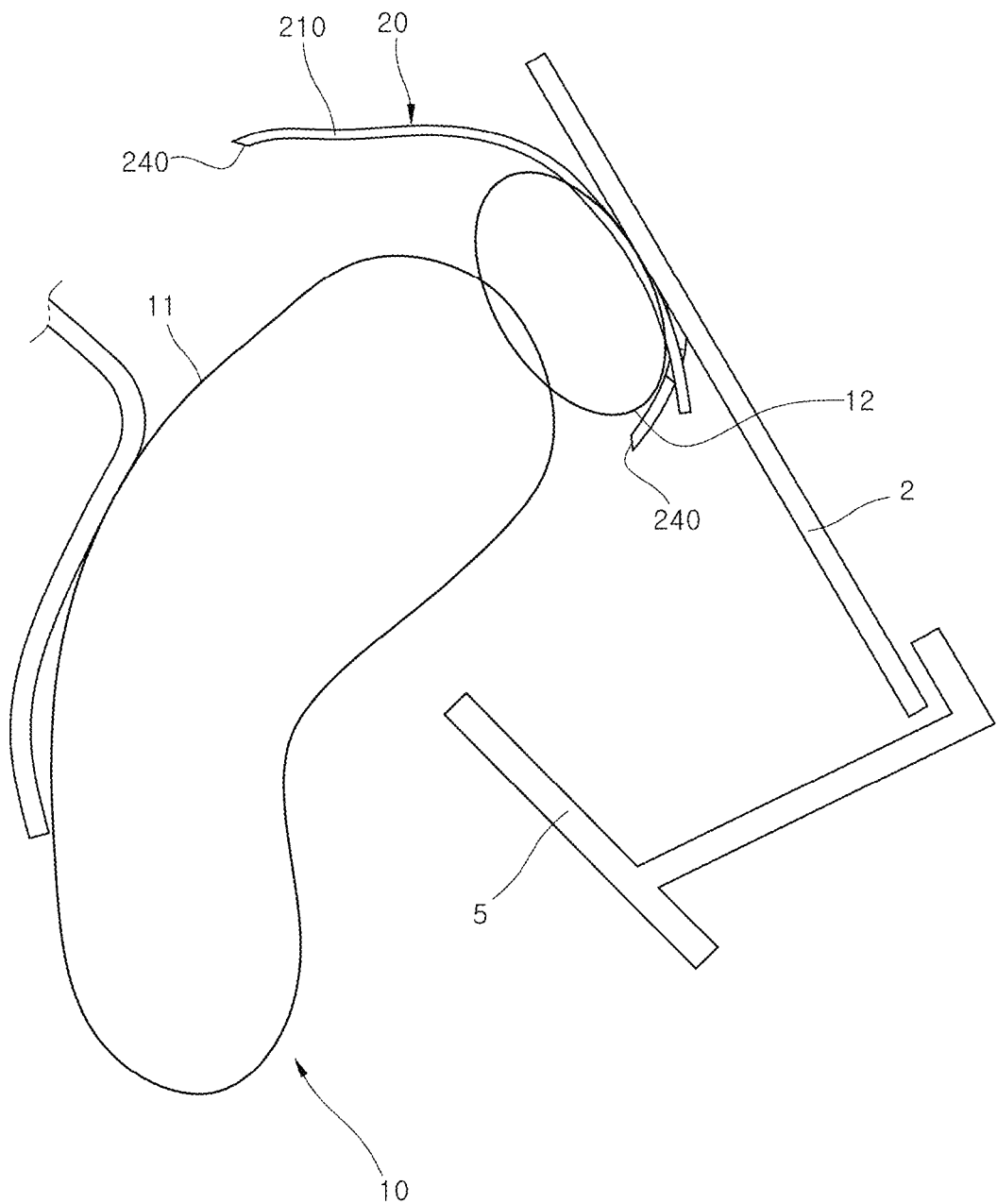
FIG. 10 is a conceptual view for explaining a deployment process of the cushion body after the strap part illustrated in FIG. 9 is broken.

FIG. 9 is a conceptual view for explaining an operation in which the strap part illustrated in FIG. 5 is broken by the deployment force of the cushion body, and FIG. 10 is a conceptual view for explaining a deployment process of the cushion body after the strap part illustrated in FIG. 9 is broken.

The tear portion 240 in accordance with an embodiment of the present disclosure is disposed at a lower portion of the folded cushion body 10 as illustrated in FIG. 5 and FIG. 7. Accordingly, when the cushion body 10 is deployed, the cushion moving part 12 is inflated and simultaneously the tear portion 240 is preferentially broken, so that the main cushion part 11 is deployed such that the main cushion part 11 is pushed away from the vehicle body 2 and simultaneously extend downward as illustrated in FIG. 9 and FIG. 10.

In accordance with an embodiment of the present disclosure illustrated in FIG. 1 to FIG. 3, one first strap 21 is disposed corresponding to the middle portion in the extension direction of the cushion moving part 12; however, the number and the arrangement position of first straps 21 are not limited thereto and a plurality of first straps 21 may be disposed spaced apart from each other at set intervals. In the description of the present disclosure, among the first straps 21, a first strap 21 disposed corresponding to the middle portion in the extension direction of the cushion moving part 12 is referred to as a middle strap 22 and a first strap 21 disposed corresponding to the end portion in the extension direction of the cushion moving part 12 is referred to as a side strap 23.

Figure 11:
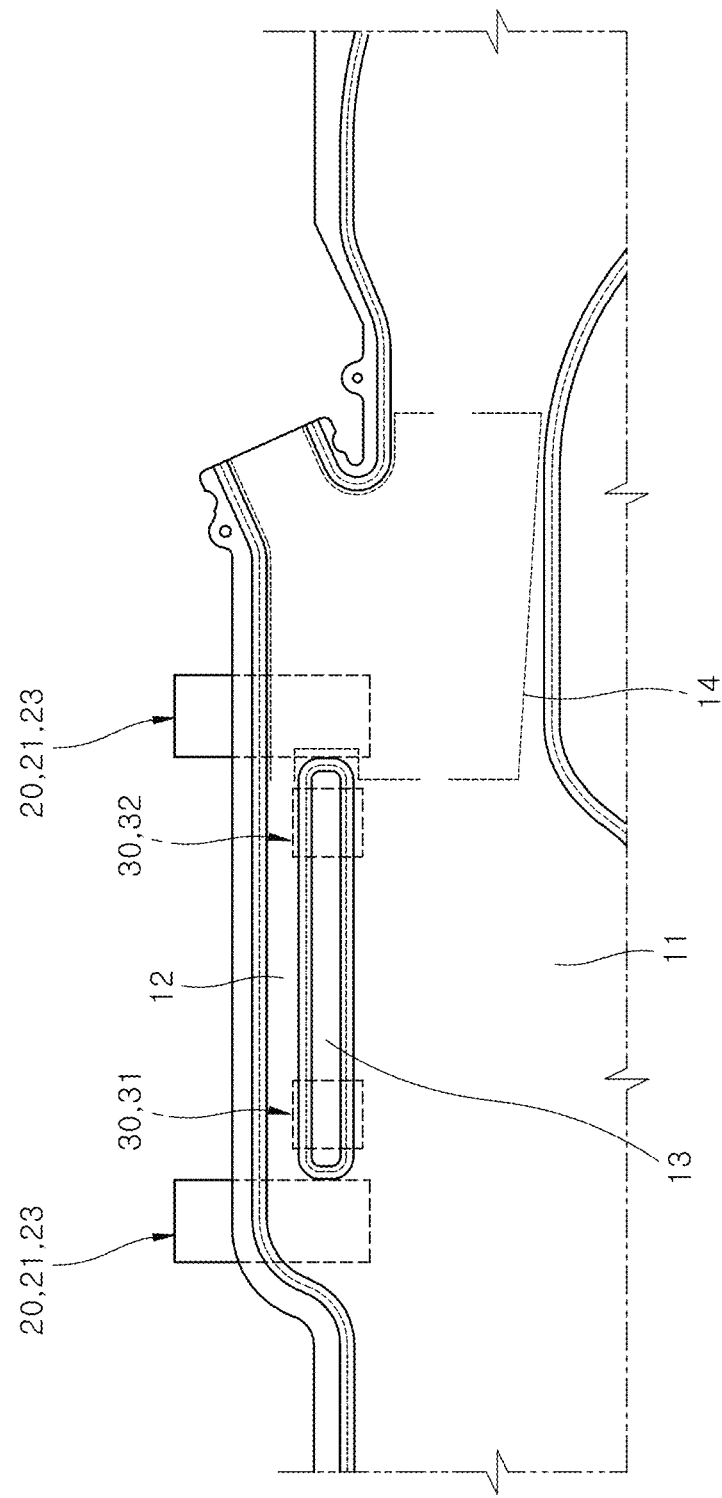
FIG. 11 is a side view schematically illustrating a curtain air bag device in accordance with another embodiment of the present disclosure.
Figure 12:
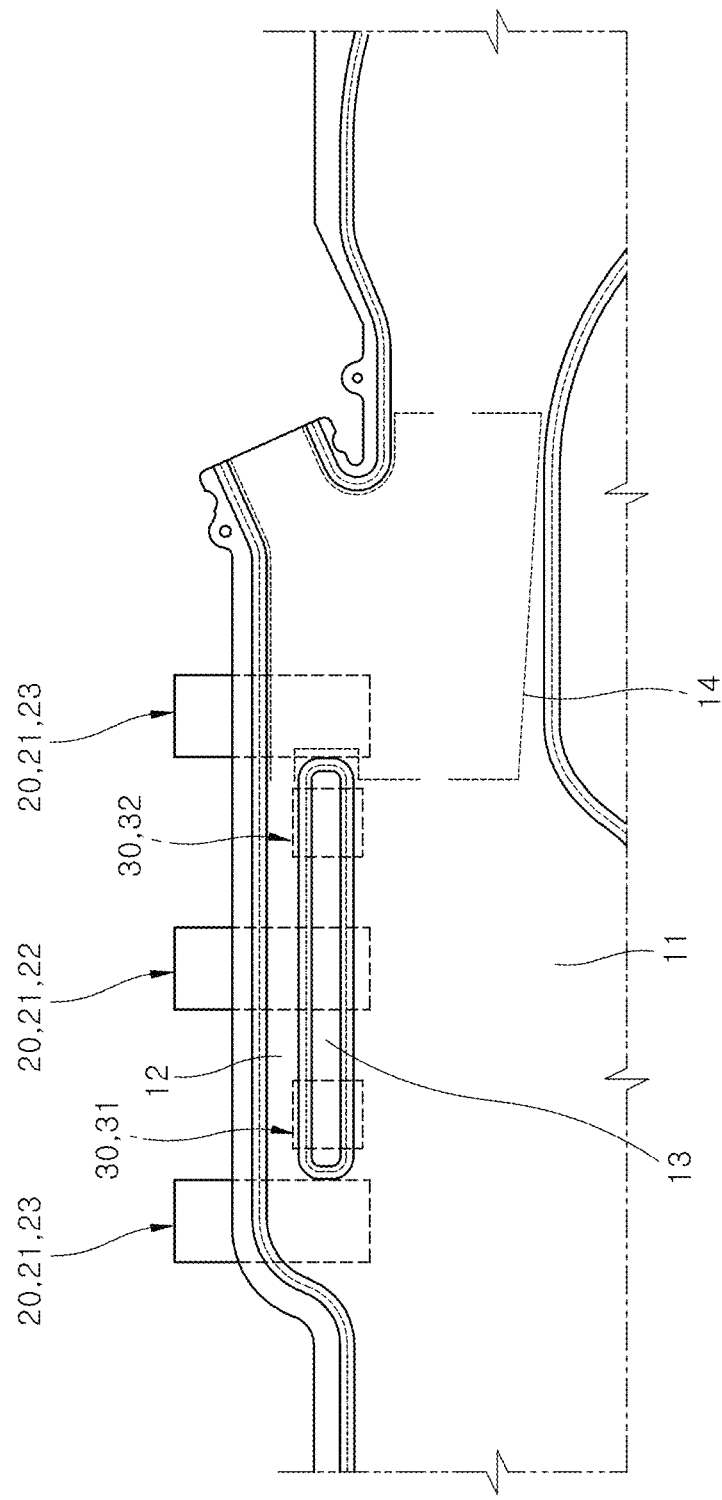
FIG. 12 is a side view schematically illustrating a curtain air bag device in accordance with further another embodiment of the present disclosure.

FIG. 11 is a side view schematically illustrating a curtain air bag device in accordance with another embodiment of the present disclosure, and FIG. 12 is a side view schematically illustrating a curtain air bag device in accordance with further another embodiment of the present disclosure.

As illustrated in FIG. 11, the first strap 21 may include a pair of side straps 23 disposed at positions corresponding to one end portion and the other portion in the extension direction of the cushion moving part 12. In such a case, the side strap 23 is disposed spaced apart from the mounting part 30 without interfering with the mounting part 30, and may be fixed to the cushion body 10 at a point, other than the inactive part 13, depending on the shape, arrangement and the like of the mounting part 30. That is, the fixing portion 220 may be formed at a point other than the inactive part 13.

By holding both end portions of the cushion moving part 12 by using the pair of side straps 23, it is possible to more stably prevent the cushion moving part 12 from being bent or twisted, compared to the embodiment in which one middle strap 22 is applied as illustrated in FIG. 2.

Furthermore, as illustrated in FIG. 12, the first strap 21 may include a middle strap 22 and a pair of side straps 23. According to the embodiment including the middle strap 22 and the pair of side straps 23, it is possible to more stably prevent the cushion moving part 12 from being bent or twisted, compared to the embodiments illustrated in FIG. 2 and FIG. 11.

The second strap 24 is disposed at the front and rear of the first strap 21, respectively, so as to be spaced apart from the first strap 21. That is, the second strap 24 is installed to surround both end portions of the cushion body 10. FIG. 4 illustrates a structure in which the second straps 24 are coupled to the front and rear of the first strap 21, respectively; however, the number and the arrangement of second straps 24 are not limited thereto and three or more second straps 24 may be provided.

The second strap 24 may have substantially the same structure as that of the first strap 21, or there may be a difference in the position of the fixing portion 220 depending on the coupling position with the cushion body 10. Since the structure and the shape of the second strap 24 correspond to the configuration of the first strap 21, a repeated description thereof will be omitted. Meanwhile, when the second strap 24 does not require fixed coupling with the cushion body 10, the structure of the fixing portion 220 may be omitted.

Referring to FIG. 3, the mounting part 30 in accordance with an embodiment of the present disclosure includes a first mounting tap 31 and a second mounting tap 32.

The first mounting tap 31 is coupled to one end portion in the extension direction of the inactive part 13. The second mounting tap 32 is disposed at the other end portion in the extension direction of the inactive part 13 so as to be spaced apart from the first mounting tap 31. The first strap 21, more specifically, the middle strap 22 is disposed between the first mounting tap 31 and the second mounting tap 32 and is coupled to the inactive part 13.

By coupling and fixing both end portions of the inactive part 13 to the vehicle body 2 by using the first mounting tap 31 and the second mounting tap 32, the entire inactive part 13 having a shape extending in the transverse direction can be stably held at a fixed position on the vehicle body 2. Accordingly, the folded shape of the cushion moving part 12 disposed adjacent to the inactive part 13 and extending parallel to the inactive part 13 can be stably kept without bending or twisting. Referring to FIG. 3, the first mounting tap 31 in accordance with an embodiment of the present disclosure includes a mounting tap portion 33 and a vehicle body coupling portion 34.

The mounting tap portion 33 is a portion coupled to the inactive part 13, wherein one side thereof comes into contact with the inactive part 13 and the other side thereof has a larger vertical width than the inactive part 13 so as to extend out of the inactive part 13. As a material of the mounting tap portion 33, a fiber material and the like having flexibility may be used such that the mounting tap portion 33 can be bent by an external force such as an attractive force. Referring to FIG. 3, the mounting tap portion 33 in accordance with an embodiment of the present disclosure includes a cushion coupling portion 331, an extension tab portion 332, and a bending connection portion 333.

The cushion coupling portion 331 is a portion coupled to the inactive part 13 and may be bonded to the inactive part 13 by a method such as sewing. The extension tab portion 332 is a portion where the vehicle body coupling portion 34 coupled to the vehicle body 2 is formed, is formed to extend out of the inactive part 13, and is integrally formed continuously with the cushion coupling portion 331.

The bending connection portion 333 is formed between the cushion coupling portion 331 and the extension tab portion 332, and has flexibility such that the bending connection portion 333 can be bent by an external force such as an attractive force. By using the bending connection portion 333, it is possible to freely move the position of the extension tab portion 332 with respect to the cushion coupling portion 331 coupled and fixed to the cushion body 10. Accordingly, the extension tab portion 332 located below the cushion coupling portion 331 as illustrated in FIG. 3 may be folded toward the cushion coupling portion 331, more specifically, so as to face the cushion coupling portion 331 or to be located above the cushion coupling portion 331 as illustrated in FIG. 6.

Figure 13:
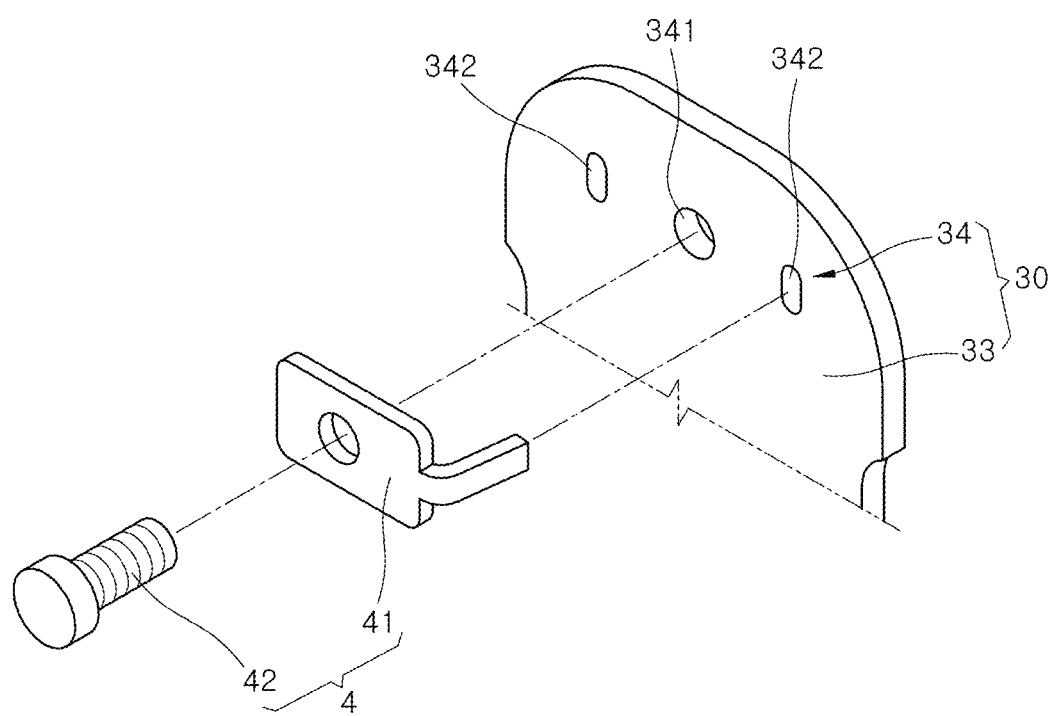
FIG. 13 is an exploded perspective view illustrating main elements of a mounting part of the curtain air bag device in accordance with an embodiment of the present disclosure.

FIG. 13 is an exploded perspective view illustrating main elements of the mounting part of the curtain air bag device in accordance with an embodiment of the present disclosure.

The vehicle body coupling portion 34 is a device portion coupled to the vehicle body 2 by a fastening member 4, and is formed to pass through the extension tab portion 332 of the mounting tap portion 33. Referring to FIG. 3 and FIG. 13, the vehicle body coupling portion 34 in accordance with an embodiment of the present disclosure includes a main fastening portion 341 and movement preventing holes 342.

The main fastening portion 341 is formed to pass through the extension tab portion 332. The main fastening portion 341 in accordance with an embodiment of the present disclosure has a circular shape. The movement preventing holes 342 are disposed spaced apart from the main fastening portion 341. The movement preventing holes 342 in accordance with an embodiment of the present disclosure each have a long hole shape extending in the vertical direction and are disposed on both sides in the transverse direction of the main fastening portion 341.

Referring to FIG. 13, the fastening member 4 includes a reinforcement fastening member 41 and a main fastening member 42. The reinforcement fastening member 41 is a member for reinforcing the rigidity of the extension tab portion 332 and ensuring the fastening force having a set strength, and has a shape capable of coming into surface contact with the extension tab portion 332. As the reinforcement fastening member 41, a bracket may be used, which is made a metal material or a synthetic resin and has a shape of '¬' or '⊏'.

The reinforcement fastening member 41 in accordance with an embodiment of the present disclosure has a flat surface capable of coming into surface contact with the extension tab portion 332 and is disposed between the cushion coupling portion 331 and the extension tab portion 332. The end portion of the reinforcement fastening member 41 has a protruding shape, which can be coupled to the vehicle body 2 by passing through the movement preventing hole 342. The end portion of the reinforcement fastening member passing through the movement preventing hole 342 has a sectional shape corresponding to the movement preventing hole 342 having the long hole shape, that is, a sectional shape extending in the vertical direction.

The main fastening member 42 is coupled to the vehicle body 2 by passing through the reinforcement fastening member 41 and the main fastening portion 341. As the main fastening member 42, a bolt member may be used. The end portions of the main fastening member 42 and the reinforcement fastening member 41 are fastened to the vehicle body 2 by passing through the main fastening portion 341 and the movement preventing holes 342, so that the first mounting tap 31 and the vehicle body 2 are coupled at a plurality of places.

When the first mounting tap 31 is fixed to the vehicle body 2 by one main fastening member 42, since the first mounting tap 31 may be arbitrarily rotated around the main fastening member 42, lateral both end portions thereof may be lifted or sagged to be spaced apart from the vehicle body 2. In this regard, according to an embodiment of the present disclosure further including the movement preventing holes 342, it is possible to substantially prevent arbitrary movement of the first mounting tap 31 described above, and to couple the first mounting tap 31 to the vehicle body 2 more stably and firmly while substantially preventing damage to the first mounting tap 31 due to concentration of a load on the main fastening portion 341.

Since the second mounting tap 32 has a configuration corresponding to the first mounting tap 31, a detailed description of the structure and action thereof will be omitted. Meanwhile, the curtain air bag device 1 in accordance with an embodiment of the present disclosure may be installed in the vehicle body 2 at a set angle and direction as illustrated in FIG. 5 and FIG. 6 by another mounting means, for example, a cushion mounting guide (not illustrated) made of a metal material or a synthetic resin material and coupled to the vehicle body 2 by the fastening member 4 such as a bolt member, in addition to the strap part 20 and the mounting part 30.

According to the curtain air bag device 1 having the above configuration in accordance with the present disclosure, when the inflator 3 is operated, the cushion moving part 12 is inflated to press the main cushion part 11 in a desired direction. Accordingly, the main cushion part 11 can be smoothly deployed in a set direction of avoiding interference with vehicle interior parts such as the vehicle body 2 or the trim 5 without additionally using a separate member such as a ramp.

In accordance with the present disclosure, it is possible to reliably implement an action of pushing the main cushion part 11 away from the vehicle body 2 and the trim 5 by using the cushion moving part 12 as the gas passing through the cushion moving part 12 smoothly flows. By using the strap part 20, the folded state of the cushion body 10, particularly, the folded state of the cushion moving part 12 can be stably kept in a desired shape without bending or sagging, so that the flow of the gas passing through the cushion moving part 12 can be substantially prevented from being inhibited due to bending or sagging of a part of the cushion moving part 12.

In accordance with the present disclosure, the folded state of the cushion moving part 12 is kept constant by using the strap part 20, so that it is possible to stably implement an operation of the cushion moving part 12 that presses the main cushion part 11 in a desired direction and to guide the deployment of the main cushion part 11 in a set direction depending on the breaking position of the strap part 20.

Furthermore, in accordance with the present disclosure, by disposing the mounting part 30 for mounting the cushion body 10 to the vehicle body 2 in consideration of the flow of the gas passing through the cushion moving part 12, more specifically, by positioning the mounting part 30 such that a part of the cushion moving part 12 is not bent or folded, it is possible to more reliably implement an operation of the cushion moving part 12 that presses the main cushion part 11 in a desired direction.

Although the present disclosure have been described with reference to the embodiments illustrated in the drawings, the embodiments of the disclosure are for illustrative purposes only, and those skilled in the art will appreciate that various modifications and equivalent other embodiments are possible. Thus, the true technical scope of the disclosure should be defined by the following claims.

What is claimed is:

1. A curtain air bag device comprising:
   a cushion body provided with a main cushion part and a cushion moving part that is inflated by gas injected from an inflator when the cushion body is deployed and presses the main cushion part in a desired direction;
   a strap part configured to bind the cushion body such that the main cushion part and the cushion moving part keep a folded shape and to be broken when the cushion body is deployed, wherein the strap part comprises:
      a first strap disposed corresponding to the cushion moving part; and
      a second strap disposed spaced apart from the first strap and configured to keep the folded state of the cushion body together with the first strap; and
   a mounting part connected to the cushion body and coupled to a vehicle body.

2. The curtain air bag device according to claim 1, wherein the cushion moving part is formed to communicate with the main cushion part, is located at an upstream of the main cushion part with respect to flow of the gas, and is disposed between the main cushion part and the vehicle body in a state in which the cushion body is folded.

3. The curtain air bag device according to claim 1, wherein the first strap comprises:
   one or more middle straps disposed corresponding to a middle portion in an extension direction of the cushion moving part.

4. The curtain air bag device according to claim 3, wherein the middle strap comprises:
   a strap body configured to surround a circumference of the folded cushion body; and
   a fixing portion formed on the strap body and fixed to an inactive part formed on the cushion body.

5. The curtain air bag device according to claim 1, wherein the first strap comprises:
   one or more side straps disposed corresponding to an end portion in the extension direction of the cushion moving part.

6. The curtain air bag device according to claim 1, wherein the strap part comprises:
   a strap body configured to surround the circumference of the folded cushion body;
   a strap binding portion formed on the strap body and configured to restrain movement of an end portion of the strap body; and
   a tear portion formed on the strap body and cut by a deployment force of the cushion body.

7. The curtain air bag device according to claim 6, wherein the strap binding portion comprises:
   a first binding portion formed at one end portion of the strap body; and
   a second binding portion formed at the other end portion of the strap body and coupled to the first binding portion in a state in which the strap body surrounds the cushion body.

8. The curtain air bag device according to claim 7, wherein the first binding portion comprises:
   a passage cut portion formed at a middle portion in a width direction of the strap body; and
   a locking base portion formed on both sides in the width direction of the passage cut portion, and
   wherein the second binding portion comprises:
   a locking cut portion formed at both end portions in the width direction of the strap body; and
   a locking blade portion formed between the locking cut portion and the end portion of the strap body and locked to the locking base portion by passing through the passage cut portion.

9. The curtain air bag device according to claim 6, wherein the tear portion is disposed at a lower portion of the folded cushion body.

10. The curtain air bag device according to claim 1, wherein the cushion body further comprises:
    an inactive part formed on the cushion body and configured to partition the main cushion part and the cushion moving part, and
    wherein the mounting part comprises:
    a first mounting tap coupled to an end portion of the inactive part; and
    a second mounting tap coupled to the other end portion of the inactive part and disposed spaced apart from the first mounting tap.

11. The curtain air bag device according to claim 10, wherein the strap part is disposed between the first mounting tap and the second mounting tap, and is coupled to the inactive part.

12. The curtain air bag device according to claim 1, wherein the mounting part comprises:
    a mounting tap portion coupled to the cushion body; and
    a vehicle body coupling portion formed on the mounting tap portion and coupled to the vehicle body by a fastening member.

13. The curtain air bag device according to claim 12, wherein the mounting tap portion comprises:
    a cushion coupling portion coupled to the cushion body;
    an extension tab portion connected to the cushion coupling portion and provided with the vehicle body coupling portion; and
    a bending connection portion formed between the cushion coupling portion and the extension tab portion and having flexibility to bend.

14. The curtain air bag device according to claim 13, wherein the vehicle body coupling portion comprises:
    one or more main fastening portions formed to pass through the extension tab portion; and
    one or more movement preventing holes disposed spaced apart from the main fastening portion, and
    wherein the fastening member comprises:
    a reinforcement fastening member formed between the cushion coupling portion and the extension tab portion, coming into surface contact with the extension tab portion, and having an end portion coupled to the vehicle body by passing through the movement preventing hole; and a main fastening member coupled to the vehicle body by passing through the reinforcement fastening member and the main fastening portion.

15. A curtain air bag device comprising:

a cushion body provided with a main cushion part and a cushion moving part that is inflated by gas injected from an inflator when the cushion body is deployed and presses the main cushion part in a desired direction, wherein the cushion body further comprises an inactive part formed on the cushion body and configured to partition the main cushion part and the cushion moving part;

a strap part configured to bind the cushion body such that the main cushion part and the cushion moving part keep a folded shape and to be broken when the cushion body is deployed; and a mounting part connected to the cushion body and coupled to a vehicle body, wherein the mounting part comprises:

a first mounting tap coupled to an end portion of the inactive part; and a second mounting tap coupled to the other end portion of the inactive part and disposed spaced apart from the first mounting tap.

16. A curtain air bag device comprising:

a cushion body provided with a main cushion part and a cushion moving part that is inflated by gas injected from an inflator when the cushion body is deployed and presses the main cushion part in a desired direction;

a strap part configured to bind the cushion body such that the main cushion part and the cushion moving part keep a folded shape and to be broken when the cushion body is deployed, wherein the strap part comprises a strap body configured to surround the circumference of the folded cushion body, a strap binding portion formed on the strap body and configured to restrain movement of an end portion of the strap body; and a mounting part connected to the cushion body and coupled to a vehicle body, and wherein the strap binding portion comprises:

a first binding portion formed at one end portion of the strap body, wherein the first binding portion comprises a passage cut portion formed at a middle portion in a width direction of the strap body and a locking base portion formed on both sides in the width direction of the passage cut portion; and a second binding portion formed at the other end portion of the strap body and coupled to the first binding portion in a state in which the strap body surrounds the cushion body, wherein the second binding portion comprises a locking cut portion formed at both end portions in the width direction of the strap body and a locking blade portion formed between the locking cut portion and the end portion of the strap body and locked to the locking base portion by passing through the passage cut portion.

* * * * *